Jan. 5, 1954 H. B. VROOM 2,665,030
PRESELECTOR MECHANISM FOR LIQUID DISPENSING APPARATUS
Filed April 13, 1950 6 Sheets-Sheet 1

Inventor
HAROLD B. VROOM
By
Lindsey, Prutzman & Just
Attorneys

Jan. 5, 1954 H. B. VROOM 2,665,030
PRESELECTOR MECHANISM FOR LIQUID DISPENSING APPARATUS
Filed April 13, 1950 6 Sheets-Sheet 2

Inventor
HAROLD B. VROOM

By
Lindsey, Prutzman & Just
Attorneys

Jan. 5, 1954    H. B. VROOM    2,665,030
PRESELECTOR MECHANISM FOR LIQUID DISPENSING APPARATUS
Filed April 13, 1950    6 Sheets-Sheet 3

Inventor
HAROLD B. VROOM
By
Lindsey, Prutzman & Just
Attorneys

Jan. 5, 1954            H. B. VROOM            2,665,030
PRESELECTOR MECHANISM FOR LIQUID DISPENSING APPARATUS
Filed April 13, 1950            6 Sheets-Sheet 4
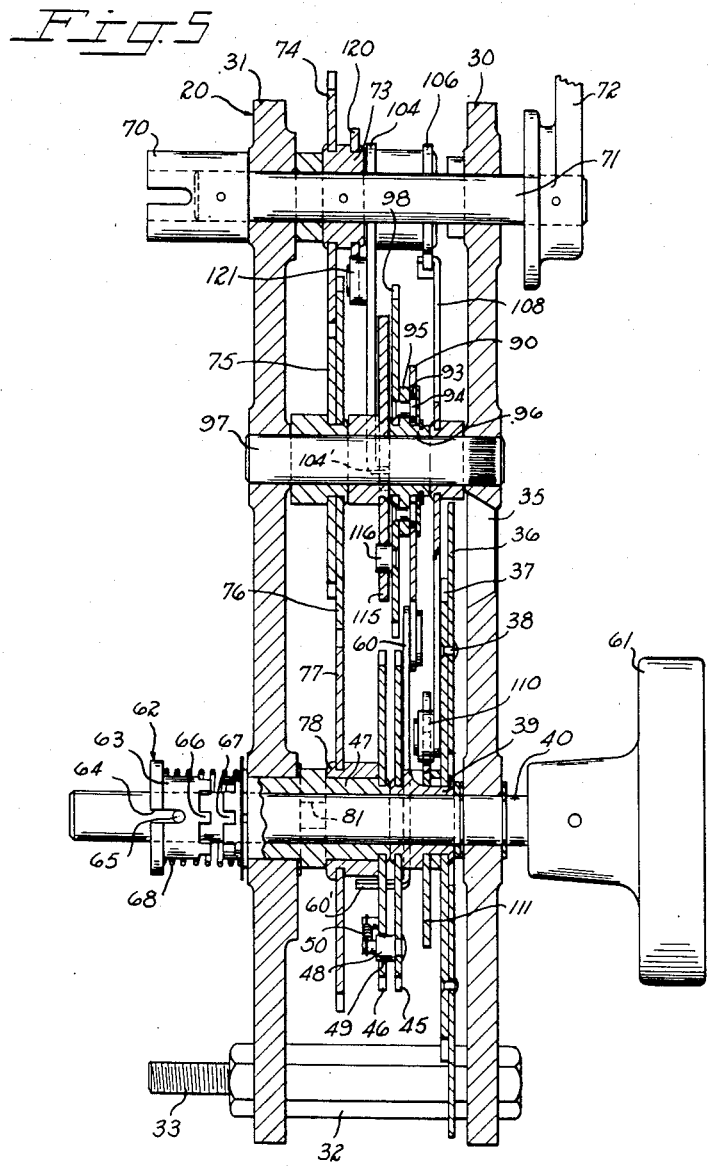
Inventor
HAROLD B. VROOM
By
Lindsey, Prutzman + Just
Attorneys Jan. 5, 1954            H. B. VROOM            2,665,030
PRESELECTOR MECHANISM FOR LIQUID DISPENSING APPARATUS
Filed April 13, 1950            6 Sheets-Sheet 5
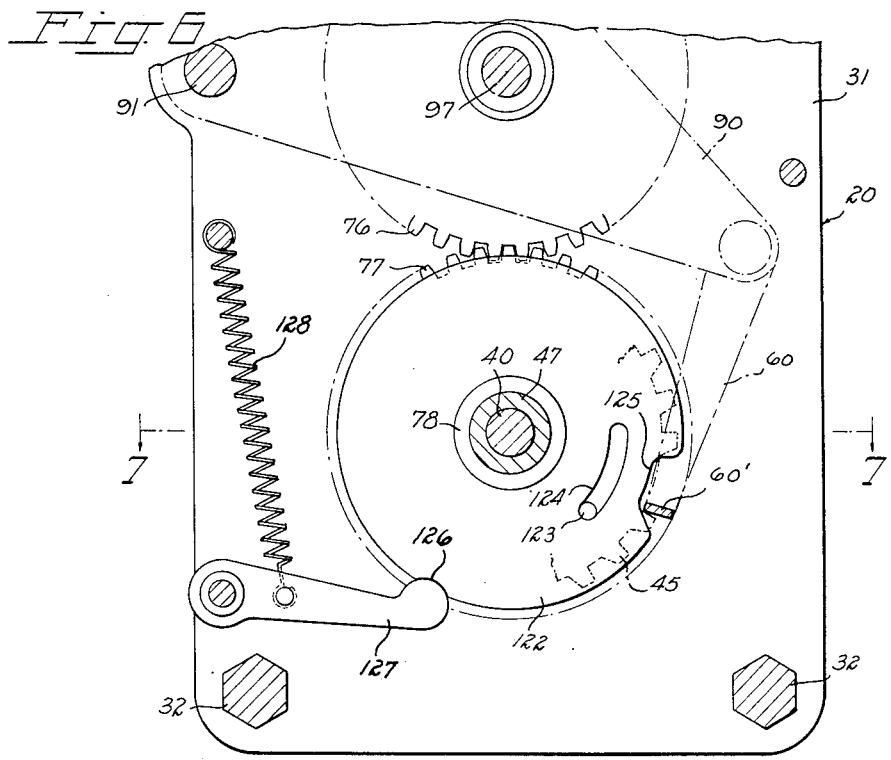
Inventor
HAROLD B. VROOM
By
Lindsey, Prutzman & Just
Attorneys Jan. 5, 1954 H. B. VROOM 2,665,030
PRESELECTOR MECHANISM FOR LIQUID DISPENSING APPARATUS
Filed April 13, 1950 6 Sheets-Sheet 6

Inventor
HAROLD B. VROOM

By
Lindsey, Crutzman & Just
Attorneys

Patented Jan. 5, 1954

2,665,030

UNITED STATES PATENT OFFICE 2,665,030

PRESELECTOR MECHANISM FOR LIQUID DISPENSING APPARATUS

Harold B. Vroom, Hartford, Conn., assignor to Veeder-Root Incorporated, Hartford, Conn., a Connecticut corporation Application April 13, 1950, Serial No. 155,665

14 Claims. (Cl. 222—16)

1

The present invention relates to a so-called preselector or predetermining mechanism which comprises an apparatus for attachment to the register of a liquid dispensing pump and which in one of its principal functions permits the operator to set the mechanism for delivery by the pump of a predetermined volume of liquid and is effective to terminate the dispensing operation upon completion of the delivery of this predetermined volume.

It is an object of the invention to provide a preselector or predetermining mechanism of the type referred to which can be easily coupled with existing well-known types of liquid dispensing apparatus and, more particularly, with the register mechanism and controls of such apparatus. In connection with this object, it is an aim to provide such a mechanism which can be easily installed, which will cooperate efficiently with dispensing apparatus generally in use and which will not interfere in any way with the effective functioning or convenience of operation of these standard instruments.

A further object of the invention is to provide a device of this character which is compact in design, efficient in operation, and economical to fabricate and assemble whereby the device may be supplied at reasonable cost and may be installed and operated with a minimum of difficulty.

Another object of the invention is to provide a preselector or predetermining mechanism of this type in which the setting of the mechanism for delivery of a predetermined volume of liquid can be accomplished in a simple and convenient operation requiring a minimum of skill or instruction and in which the setting of the mechanism can be readily observed at all times.

A further object of the invention is to provide a preselector or predetermining mechanism of this type in which the setting can be changed at will to either increase or reduce the predetermined amount at any time before a dispensing operation is initiated but which at the same time is so constructed that any variation of the predetermined volume is effectively prevented thereafter and until the dispensing operation has been completed. In this connection it is an aim to provide an arrangement whereby the resetting of the register to zero automatically conditions the preselector to permit the referred to manual setting thereof or in the alternative, if desired, whereby the step of turning off the pump at the end of one dispensing operation will condition the preselector to permit the resetting of the preselector for a subsequent delivery without the need for resetting the register. In this latter embodiment it is desired to provide an arrangement whereby the resetting operation will not vary the setting of the preselector.

Another object of the invention is to provide a preselector mechanism in which the mechanism is conditioned for operation of the pump controls by the resetting mechanism alone and without need for further manipulation of the preselector mechanism on the part of the operator.

Another object of the invention is to provide a preselector or predetermining mechanism as above described which is effective not only for terminating the dispensing operation when the preselected volume of liquid has been dispensed, but which also will materially reduce the dispensing rate shortly prior to the completion of the delivery whereby the final shutting off of the delivery operation is accomplished in a more accurate and easier fashion.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 5 is a cross-sectional view taken along the line 5—5 of Fig. 3.

Fig. 6 is a fragmentary cross-sectional view showing a modification of the resetting elements of the preselector.

Fig. 7 is a cross-sectional view taken along the line 7—7 of Fig. 6.

Figure 8:
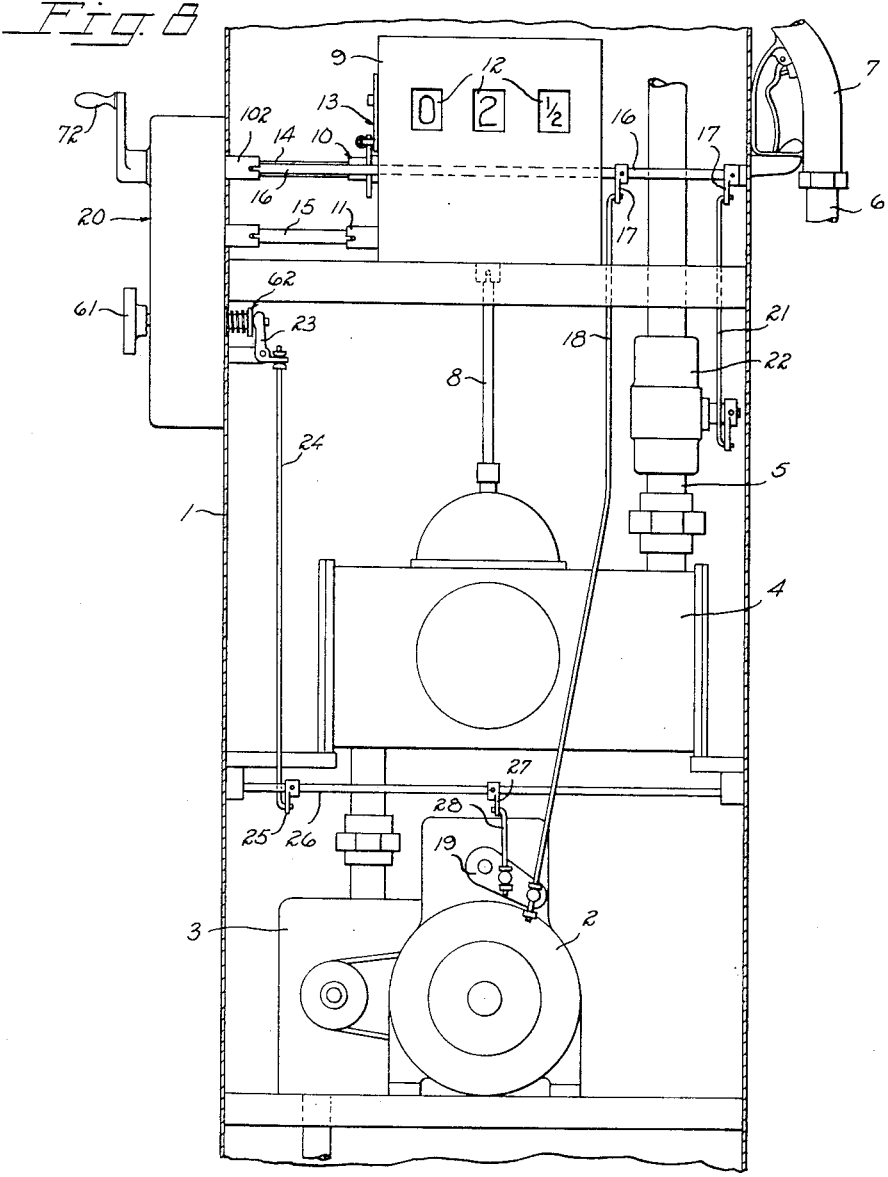
Fig. 8 is a fragmentary diagrammatic side view of a liquid dispensing pump apparatus with the preselector mechanism installed and showing the valve and motor control connections.

For purposes of illustrating and describing the use and functioning of the preselector mechanism of this invention, there is shown diagrammatically in Fig. 8 of the drawings a conventional type of gasolene dispensing apparatus. This mechanism includes within a usual rectangular housing 1, an electric motor 2 for driving a liquid pump 3 which is connected to a reservoir (not shown) of the liquid to be dispensed and which acts to pump the liquid from this reservoir through a meter 4 and a delivery pipe 5 from whence it is released through a hose 6 and dispensing nozzle 7. The amount of liquid pumped by the liquid pump 3 is measured by the meter 4 which is connected by a shaft 8 to a register 9. The register 9 may be of any well-known type such as that shown in the Slye Patent No. 2,264,557, issued December 2, 1941. The present invention does not reside in the liquid dispensing apparatus per se and the same is described herein principally for the purpose of background and to permit the operation and functioning of the device of this invention to be fully described.

Reference may be had to the aforesaid Siye patent for any additional details of construction of the register 9 not shown in the present drawings. For purposes of the present description, the register 9 is merely shown as provided with a reset shaft 10, a drive shaft 11 and indicating members 12. As will be readily understood, during a dispensing operation the rotation of the connecting shaft 8 turns the shaft 11 of the register 9, which in turn drives the number wheels 12 to register the volume dispensed. The number wheels are generally utilized in duplicate sets so that the registration can be read from either the front or back of the pump. As is customary in a device of this type, the first number wheel of each set is driven directly by the shaft 11 and each revolution of the first wheel is then transmitted to the second wheel by a suitable transfer mechanism, and in like manner the rotations of the second wheel are transferred in steps to the third wheel. If desired, the register may also indicate the cost of the liquid dispensed but such mechanism has been omitted from the present apparatus for simplicity of presentation since its absence or presence does not affect the functioning of the preselector of the present invention.

In order to reset the register to zero, the reset shaft 10 is connected in the usual way to the shaft (not shown) on which the number wheels 12 are mounted whereby the shafts may be turned in the direction of normal rotation of the wheels by turning the reset shaft 10 in the proper direction. The reset shaft 10 and number wheel shafts are normally stationary (except during resetting) and in the usual installation the number wheel shafts contain a reset groove which is engaged by so-called reset pawls in the number wheels 12 so as to return them to zero when the shafts are turned through one revolution in a registering direction. Stop means is normally provided to limit turning of the reset shaft 10 to the amount required to reset the number wheels to zero. In the register illustrated in the drawings, the reset shaft is automatically rotated reversely about 45° by means shown diagrammatically at 13 at the completion of a resetting operation. The reason for this provision is that it then becomes necessary to rotate the reset shaft through one complete turn plus the 45° set back in order to reset the number wheels to zero in a subsequent resetting operation and this fully insures that all of the wheels will be picked up. In resetting the number wheels to zero, the drive shaft 11 being connected to the first number wheels is also returned to an initial rotating position during the resetting operation. Rotation of the drive shaft 11 during resetting is usually permitted by any convenient slip clutch arrangement (not shown) located between the meter shaft 8 and the drive shaft 11.

Turning to the preselector mechanism of the present invention, the same is shown generally at 20 and is connected by shafts 14 and 15 to the reset shaft 10 and drive shaft 11 respectively with the result that the preselector and register can be reset and driven in unison, as more particularly described hereinafter. As previously mentioned, the function of the preselector 20 is to terminate the dispensing operation when the desired volume of gasolene as preset on the preselector is dispensed. To accomplish this result, there is shown by way of illustration a shaft 16 extending transversely of the pump mechanism to which are fixed a plurality of crank arms 17. One crank arm 17 is connected by a connecting rod 18 to the switch 19 of the electric motor 2. The other crank arm 17 is connected by connecting rod 21 to a valve 22 which is situated in the outlet pipe 5. As explained more fully hereinafter, the shaft 16 is partially actuated by the preselector shortly prior to the end of the dispensing of the predetermined volume of liquid which permits the valve 22 to partially close and then, when the entire predetermined amount of liquid has been dispensed, the shaft 16 is further actuated, causing the valve 22 to close completely and also causing the motor switch 19 to be turned to the "off" position. Accordingly, upon full movement of shaft 16 by the preselector, no further delivery of liquid can be accomplished thereafter and, as later explained, the preselector and register must be reset in order to again open the valve 22 and the switch 19 of the electric motor 2.

Figure 2:
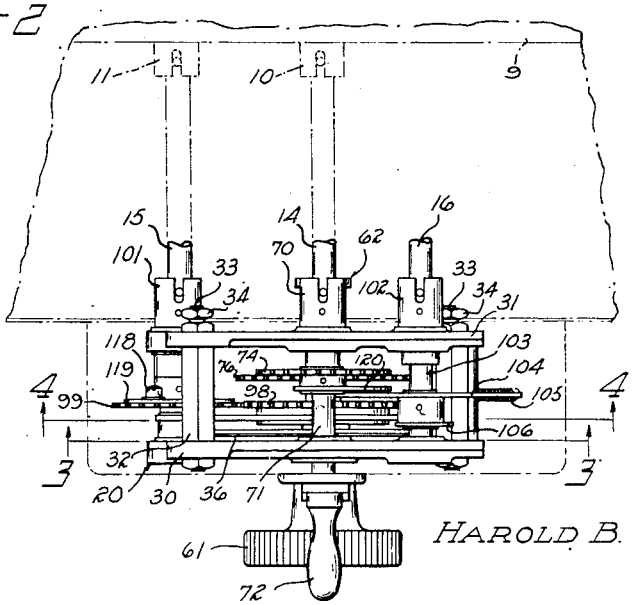
Fig. 2 is a top view similar to Fig. 1 and showing the connecting members.

Referring now particularly to Fig. 2 of the drawings, it will be seen that the preselector mechanism 20 includes a front plate 30 and rear plate 31, held in spaced apart relationship by posts 32. The frame so formed may be attached to the housing of the pump mechanism in any suitable manner such as the studs 33 and nuts 34.

Figure 1:
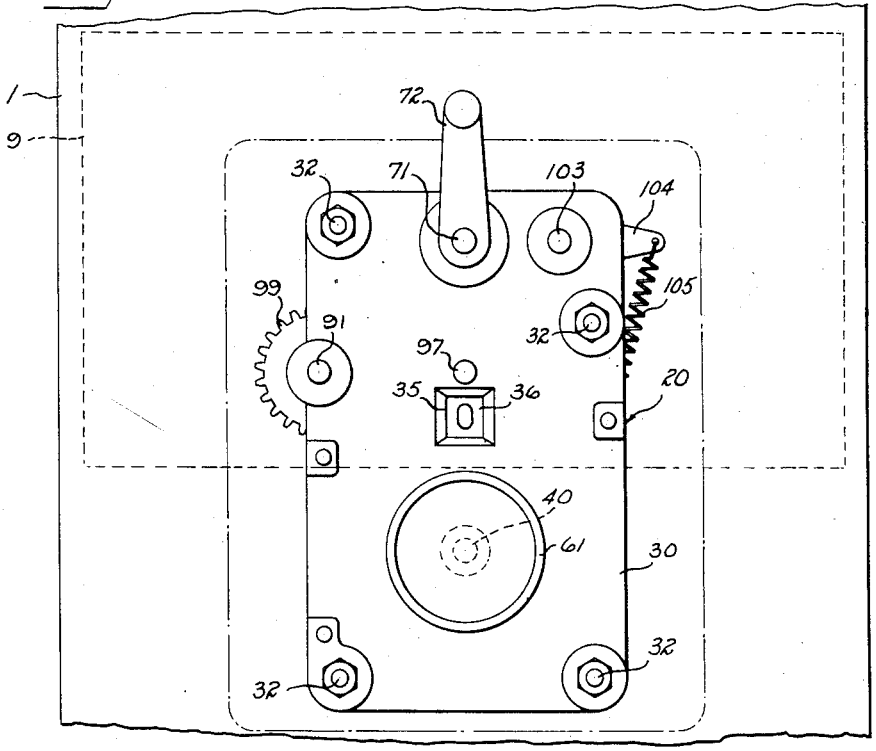
Fig. 1 is a front view of a preselector embodying the present invention and mounted on a liquid dispensing pump, the latter being shown in fragmentary and diagrammatic form.
Figure 3:
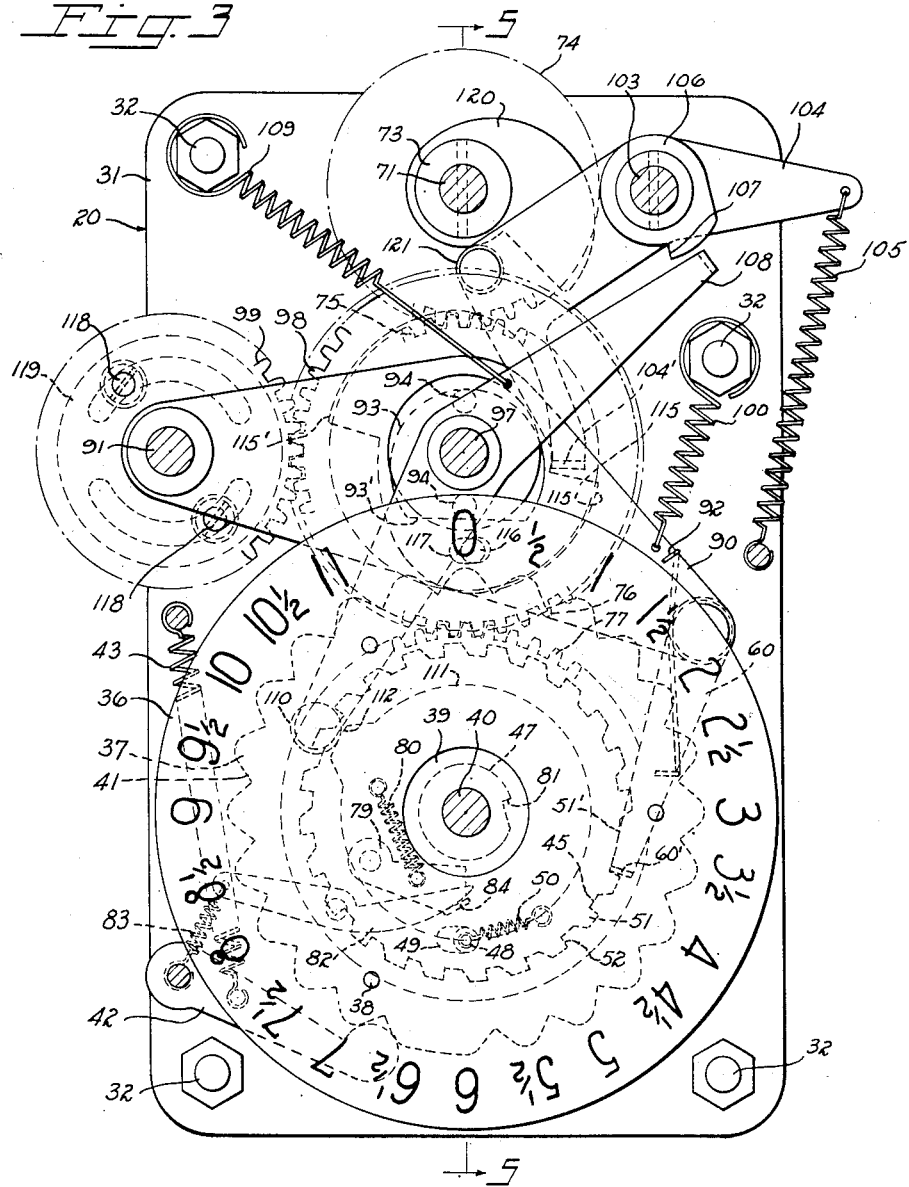
Fig. 3 is a cross-sectional view taken along the line 3—3 of Fig. 2.

As best shown in Figs. 1 and 5 of the drawings, the front plate 30 contains a window 35 through which may be viewed a dial 36 on which are printed suitable indicia representing predetermined amounts of liquid to be dispensed. In the specific embodiment, by way of example, the indicia of zero to 11 in steps of ½ are utilized as best shown in Fig. 3. The setting of the dial 36 is indicated by the particular indicia registering with the window 35.

As best shown in Fig. 5 of the drawings, the dial 36 is fastened to an indexing plate 37 by rivets 38, the plate 37 being fixed on a hub 39. The hub 39 in turn is rotatably supported on a shaft 40, journaled in the front and rear plates, and hereinafter referred to as the presetting shaft. The periphery of the indexing plate 37 is provided with a plurality of notches 41 and cooperating therewith is a holding pawl 42 which is mounted for pivoting movement into engagement with the periphery of the indexing plate 37 and is biased into such engagement by the spring 43. The notches 41 correspond in number and spacing to the indicia on the dial 36, and the function of the pawl 42 is to accurately position the dial with one of the indicia accurately registering with the window 35. Also fixed to the hub 39 is a ratchet wheel 45 by means of which the hub 39 and hence the indexing plate 37 and dial 36 may be driven.

In order to turn the ratchet wheel 45 during a resetting operation or when it is desired to set the preselector for the delivery of a predetermined volume of liquid, there is provided a second ratchet wheel 46 which is fixed to a hub 47 loosely mounted on the shaft 40 and in side-by-side relationship with the hub 39, previously referred to. Interconnecting the ratchet wheels 45 and 46 is a pin 48 fixed to the ratchet wheel 45 and extending through an elongated slot 49 in the ratchet wheel 46. A spring 50 extending between the end of the pin 48 and the ratchet wheel 46 urges the ratchet wheel 46 into the position shown in Figs. 3 and 4, i. e. with the pin at the righthand extremity of the slot as viewed in Figs. 3 and 4. As will be apparent, when the ratchet wheel 46 is turned in a clockwise direction as viewed in Figs. 3 and 4, the end of the slot 49 will remain in engagement with the pin 48 and thus cause the ratchet wheel 45 to rotate simultaneously with the ratchet wheel 46. On the other hand, if the ratchet wheel 46 is turned in a counterclockwise direction, there will be no movement of the ratchet wheel 45 until the ratchet wheel 46 has moved sufficiently to engage the opposite end of the elongated slot 49 with the pin 48.

Figure 4:
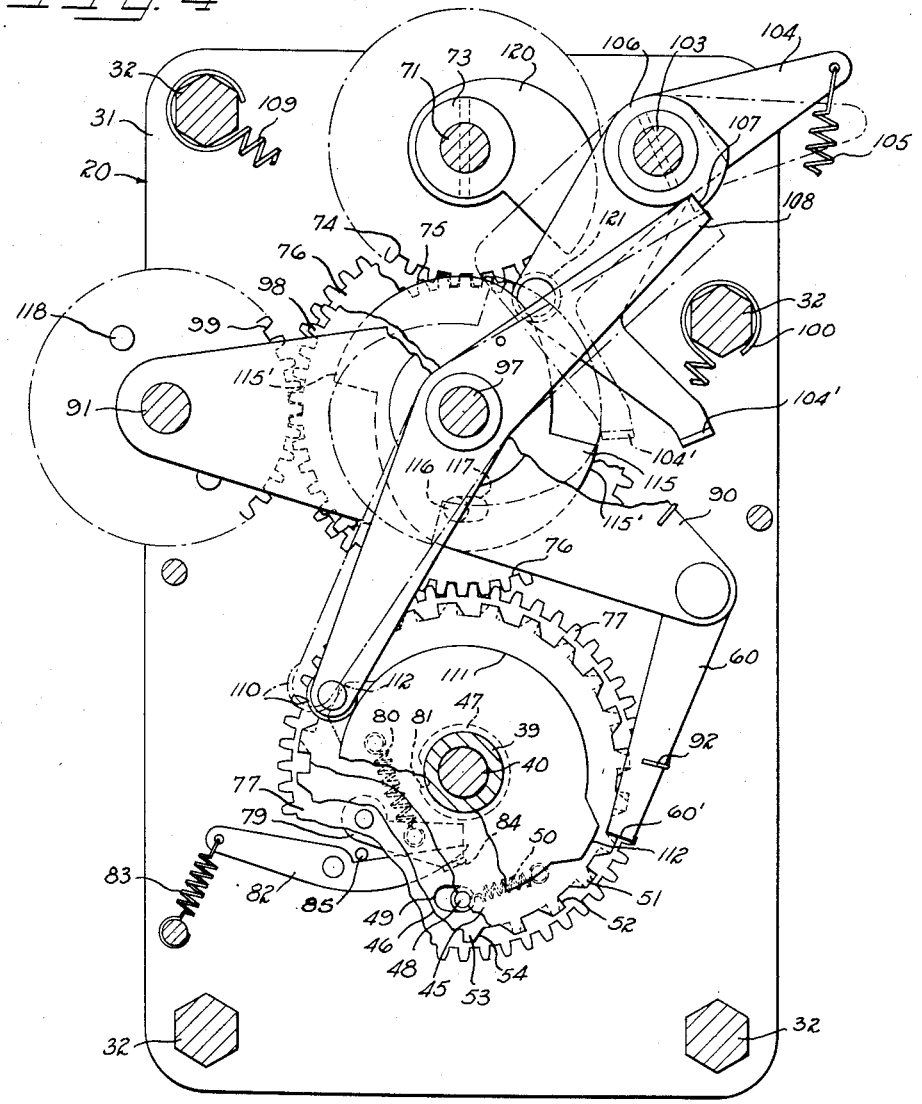
Fig. 4 is a cross-sectional view taken along the line 4—4 of Fig. 2.

As best shown in Fig. 4 of the drawings, the ratchet wheel 45 is provided with teeth 51 having a radially directed flat edge 52 facing in a counterclockwise direction, while the opposite surface of the teeth 51 are inclined. This shape of the teeth 51 permits the ratchet wheel 45 to be rotated by the reciprocation of a driving pawl 60 during a dispensing operation, to be described more particularly hereinafter. When the driving pawl 60 is reciprocated downwardly, its free end, shown slightly flanged at 60', engages against the surface 52 of one of the teeth 51, thus advancing the ratchet wheel 45, and then on the upstroke the pawl is cammed outwardly by the inclined rear surface of the succeeding tooth, and at the end of the upstroke falls into engagement with the succeeding tooth for again advancing the ratchet wheel. With such an arrangement, the ratchet wheel 45 can be advanced manually for presetting purposes in a clockwise direction at any time but cannot be turned counterclockwise because the teeth 51 would engage against the pawl 60.

Referring now to the ratchet wheel 46, it will be seen that the teeth 53 thereof are faced in an opposite manner, i. e. with an inclined surface 54 facing in a counterclockwise direction. The teeth 53 are normally behind the teeth 51 of ratchet wheel 45 and thus inoperative but, when the ratchet wheel 46 is turned in a counterclockwise direction, as viewed in the drawings, the ratchet wheel 46 first will move relative to ratchet wheel 45 (because of elongated slot 49) thus advancing the teeth 53, and particularly the inclined surfaces thereof, so as to cam out the driving pawl 60 before the ratchet wheel 45 begins to rotate. In this way the ratchet wheel 45 is freed of the pawl 60 and permitted to turn with the ratchet wheel 46 in a counterclockwise direction when the pin 48 is engaged by the trailing edge of the elongated slot 49. Accordingly, by driving ratchet wheel 45 through ratchet wheel 46 instead of directly, the dial can be set by turning in either direction.

In the operation of the preselector mechanism, it is contemplated that prior to a dispensing operation the dial 36 will be preset manually for the volume of liquid which it is desired to dispense; and in order to permit presetting in either direction, this is accomplished through the ratchet wheel 46. For this purpose, there is provided a knob 61 of conveniently large size, pinned to the outer end of the shaft 40 and on the rear of the shaft 40 there is provided a clutch mechanism 62 for engaging the shaft 40 with the hub 47, previously referred to. As previously mentioned, ratchet wheel 46 is fixed to hub 47. The clutch 62 comprises a sleeve 63 having a slot 64 in which is received a pin 65 extending into the shaft 40. The forward end of the sleeve 63 is provided with lugs 66 for engaging in notches 67 formed in the hub 47. A spring 68 is provided to keep the clutch normally disengaged.

As shown in Fig. 8 of the drawings, the clutch 62 is operated by a bell crank 23, which is connected through connecting rod 24, arm 25, shaft 26, arm 27, and connecting rod 28 with the switch 19 of the pump motor 2. The connection is such that, when the motor switch is off, the clutch is engaged and, when the motor switch is on, the clutch is disengaged. Accordingly, when the motor switch 19 is off, the operator can change the setting of the dial 36 by turning the operating knob 61 in either direction, but when the motor switch is on, the setting of dial 36 cannot be changed.

In the embodiment shown in Figs. 1-5 the device is constructed so that when the register is reset to zero, the preselector is automatically set for a maximum delivery which, in the example illustrated in the drawings, is an amount of 11 gallons. As previously mentioned, the reset shaft 10 of the register 9 is connected by a shaft 14 to the preselector mechanism. More specifically, as best shown in Figs. 2 and 5, the shaft 14 is connected by a coupling 70 with a shaft 71 journaled in the front and back plates adjacent the top of the device. Fastened to the outer end of the shaft 71 is a crank 72, which is provided for manual operation by the operator to reset the register. Pinned to the shaft 71, intermediate its ends, is a hub 73 on which is fixed a gear 74. The gear 74, through idler gears 75 and 76 (the latter being fastened together) drives a gear 77 which is mounted on a sleeve 78, which is freely rotatable on the hub 47, previously referred to. The gear 77 carries a pivotally mounted pawl 79 which is biased by spring 80 in a direction for engagement with the hub 47, the hub 47 being provided with a notch 81, as best shown in Fig. 3, by means of which the pawl 79 and hence gear 77 can engage and drive the hub 47. By reason of the intercoupled ratchet wheels 45 and 46, previously described, rotation of the hub 47 by gear 77 will return the dial 36 to the desired maximum setting of 11 gallons. It will be understood that the gear 77 will always be turned to the same rotated position on every resetting operation, this by reason of the stop means built into the reset mechanism of the register as previously mentioned. Accordingly, the notch 81 can be so situated that the rotation of the hub 47 by the gear 77 will always return the dial 36 to the desired preset position.

As previously mentioned, the register 9 of the liquid dispensing apparatus is so constructed that the reset shaft is automatically returned 45° at the end of a resetting operation with the result that gear 77 also will be reversely rotated 45°. When this occurs, means is provided in the presettor mechanism for latching out the reset pawl 79 to render it inoperative until a subsequent resetting operation, and thus permit the hub 47 to be freely turned by the operator through manipulation of the knob 61. The means provided is a latch 82 which is pivoted on the rear plate 31 and the nose portion of which is biased toward the hub 47 by a spring 83. Pivoting movement of the latch toward the hub 47, however, is limited by the pin 85. When the gear 77 is rotated backwardly 45° at the termination of a resetting operation, a flange 84 on the reset pawl 79 engages under the nose of the latch 82 and thus the pawl is cammed outwardly away from the hub 47 sufficiently so that it cannot engage the notch 81. On the other hand, because the latch 82 is pivotally mounted, it will not interfere with the rotation of gear 77 in a counterclockwise direction, this because the latch will be cammed out of the way when engaged by the flange 84 moving in this opposite direction.

Turning now to the driving or subtracting mechanism, which is operated during a dispensing operation, it was previously mentioned that the drive pawl 60 operates the ratchet wheel 45. The drive pawl 60 is pivotally mounted on the end of a lever arm 90, which is pivoted at its opposite end on a shaft 91. The drive pawl 60 is biased into engagement with the ratchet wheel 45 by a torque spring 92. The intermediate portion of the lever arm 90 is formed with an internal eccentric cam 93, as best shown in dash lines in Fig. 3 of the drawings. The internal cam 93 is formed in the embodiment shown as a depression of non-circular outline in which are received a pair of pins 94, extending from a flange 95 of the hub 96, freely mounted on a jack shaft 97. The arm 90 is biased upwardly (counterclockwise) by spring 100 and is reciprocated each time one of the pins 94 engages the flat portion 93' of the cam 93. The hub 96 is secured by pins 94 to a gear 98 which meshes with a gear 99 secured to the shaft 91, previously referred to. The shaft 91 is connected by a coupling 101 to the shaft 15, extending to the drive shaft 11 of the register. Accordingly during a registering or dispensing operation, the shaft 91 is rotated in unison with the register drive shaft and which, in turn, by means of the gears 98 and 99, causes rotation of the pins 94, thereby reciprocating the arm 90 and its depending drive pawl 60. In the embodiment shown, the gear ratios employed are such that, when the register drive shaft is turned an amount equal to the dispensing of ½ gallon, the gear 98 is rotated one half turn whereby the arm 90 is pivoted through one complete cycle, thus moving the ratchet wheel 45 one notch and moving the dial ½ gallon.

As previously mentioned, the purpose of the preselector is to terminate a dispensing operation when the predetermined volume of liquid has been dispensed. As explained hereinafter, means are provided whereby when the dial 36 is returned to zero by the mechanism just described, the valve 22 is automatically closed and the motor switch 19 is turned off. In any event, the dial 36 cannot be driven past the zero position for the further reason that one of the teeth 51 which normally would be engaged by pawl 60 when the dial is at zero has been omitted as shown at 51', thereby rendering the drive ineffective when the zero position is reached.

As previously mentioned, the connection to the motor switch 19 and the valve 22 is through a shaft 16. The shaft 16 is connected by a coupling 102 to the jack shaft 103, to which is secured a trip pawl or control member 104, which is generally L-shaped, as best shown in Figs. 3 and 4. The trip pawl 104 is biased in a clockwise direction, as viewed in Figs. 3 and 4, by means of a relatively heavy spring 105. The arrangement is such that, when the jack shaft 103 is released, the spring 105 will rotate the jack shaft 103 through the trip pawl 104 in a direction to close the valve 22 and open the motor switch 19.

Also secured to the shaft 103 and the trip pawl 104 is a latching disk 106 having a notch 107 which is engageable with the end of a trip lever 108 pivoted intermediate its ends on the shaft 97. A spring 109 biases the trip lever 108 into engaging position as shown in solid lines in Fig. 4. As will be apparent when the shaft 103 and latching disk 106 are turned in a counterclockwise direction as viewed in Figs. 3 and 4, which is the direction for opening the valve 22, the upper end of the trip lever 108 will engage in the notch 107 and hold the shaft 103 in position for permitting a dispensing operation. The opposite end of the trip lever 108 is provided with a roller 110 which engages on the periphery of a trip cam 111 which is fixed to the hub 39 and thus rotates in unison with dial 36. The trip cam 111 has a lobe or projection 112 which upon engagement with the roller 110, will pivot the trip lever 108 sufficiently to release the latching disk 106. The lobe or projection 112 is disposed at an angular position such that it trips the trip lever 108 when the dial 36 has been returned to a position close to zero, preferably intermediate the one-half gallon and zero positions.

When the latching disk 106 is released by the tripping of the trip lever 108, the shaft 103 and trip pawl 104 are free to rotate in a clockwise direction under the influence of spring 105 until the free end of the trip pawl 104, which is flanged at 104', engages against the periphery of a cam 115 which is loosely mounted on the shaft 97 but rotated by the gear 98 as explained hereinafter. The position of the cam 115 at the moment of release of the trip lever 108 is such that the trip pawl 104 will fall on one of the high portions 115' of the cam and thus be held in a position at which the valve 22 remains partially open, preferably at about one-tenth of capacity. This position is shown in dash and dot lines in Fig. 4. Accordingly, for the remainder of the dispensing operation, dispensing is carried out at a greatly reduced rate. The cam 115 is driven by gear 98 by means of a pin 116 on the gear 98 which extends through an elongated slot 117 in the cam 115. By reason of this connection, the cam 115 is slightly in retard of the gear 98 while the gear is driving the cam 115. On the other hand, when the flange 104' rides off one of the high portions 115', the cam 115 can advance slightly, thus assuring a quick trigger action which permits the pawl 104 and hence shaft 103 to snap instantly to the final off position. The final off position is shown in dash lines in Fig. 3. The reason for employing two high portions or lobes 115' is, of course, because the gear 98 and hence the cam 15 is rotated only one half turn during the dispensing of the last half gallon of liquid. By reason of the snap action afforded by cam 115 and the reduced rate of dispensing while the cam 115 is in effect, it is assured that the termination of delivery will be extremely accurate and come exactly at the desired zero point. By adjusting the angular position of gear 99 on shaft 91 which is permitted by screws 118 which adjustably connect gear 99 to a disk 119 fixed to shaft 91, the operation of the preselector and register can be exactly synchronized.

It is a feature of the device of the present invention that when the preselector and the register are reset, the trip pawl 104 is automatically cocked, thus conditioning the dispensing pump for immediate delivery without the need for any supplementary cocking mechanism. The mechanism for accomplishing this result comprises a snail cam 120 fixed to the reset shaft 71 and which is so arranged that it engages a roller 121 on the elbow of the trip pawl 104 and cams the pawl into latched position during the reset operation which is carried out, as previously described, by turning the shaft 71 through slightly more than one complete revolution by means of the handle 72.

In the event it is preferred to permit the resetting of the register without affecting the setting of the preselector dial, which is desirable when it is the aim to permit the preselector dial to be set by the operator prior to resetting, means may be provided to accomplish this purpose as shown in the modification of Figs. 6 and 7. In this embodiment, the elements for the most part are the same as in the embodiment previously described, and, therefore, the major portion of the preselector will not be redescribed. Where identical parts to that of the first embodiment are shown, the same reference numerals are utilized.

In the embodiment shown in Figs. 6 and 7, the pawl 79 (pivotally mounted on gear 77 in the first embodiment) is omitted with the result that the gear 77 cannot drive the hub 47 and hence the dial 36 during a resetting operation. In addition, a cam plate 122 is rotatably mounted on the hub 47 in side by side relationship with gear 77 and connected to gear 77 by means of a pin 123 extending outwardly from the gear 77 through an elongated opening 124 in the plate 122. The cam plate 122 has a circular periphery except for a first notch 125 having a length equal to the space occupied by two teeth of the ratchet wheels 45 and 46 and a second notch 126 for receiving the nose of a holding pawl 127 biased into engagement therewith by spring 128. The notch 125 is situated so as to receive the flanged lower end 60' of pawl 60 when at rest between resetting operations, the flanged end 60' being extended to the plane of the cam plate 122. This permits pawl 60 to operate ratchet wheel 45 in the usual manner during a dispensing operation. However, when the gear 77 is rotated during a resetting operation, the gear 77 picks up the cam plate 122 by means of pin 123 and elongated opening 124, which causes the cam plate to rotate with the gear. As a result, the pawl 60 is cammed outwardly by the periphery of cam plate 122 sufficiently to disengage the pawl 60 from the ratchet wheel 45 during resetting. Accordingly any reciprocation of the pawl 60 caused by rotation of the register drive shaft 11 during resetting as previously explained, will not affect the setting of the dial 36. At the end of the resetting operation the lower end 60' of pawl 60 is received in notch 125 thus conditioning the device for driving the dial 36 during a subsequent dispensing operation. The elongated opening 124 permits the gear 77 to be reversely rotated 45° at the end of the resetting operation as previously described without changing the position of the cam plate 122. The notch 126 is situated so that holding pawl 127 will be received therein at this rotated position, thereby yieldingly holding cam plate 122 in desired position during dispensing and further insuring that cam plate 122 will not be moved during the reverse rotation of gear 77.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein illustrated and described since the same may be carried out in other ways, falling within the scope of the invention as claimed.

I claim as my invention:

1. A preselector mechanism for use with a liquid dispensing apparatus of the type having a shut-off valve and a register provided with resetting and driving means, said preselector mechanism comprising a presettable rotatable member, means for rotating the presettable member by the driving means of the register during a dispensing operation, a rotatable cam, means for rotating the cam by the driving means of the register during a dispensing operation, a spring-loaded valve closing mechanism, means connected to the valve closing mechanism and engageable with the cam for retaining the valve closing mechanism in position for partially opening the valve, said last-named means being releasable by said cam at a predetermined rotated position of the cam, means for retaining the valve closing mechanism in position for fully opening the valve including a trip lever operable by the presettable rotatable member at a predetermined rotated position thereof, and means for simultaneously operating the resetting means of the register and moving the valve closing mechanism into the last named position.

2. A preselector mechanism for use with a liquid dispensing apparatus of the type having a shut-off valve and a register provided with resetting and driving means, said preselector mechanism comprising a rotatable member, means for rotating the member in either direction to preset the member at a desired rotated position, means for returning the member to a predetermined initial rotated position operable by the driving means of the register during a dispensing operation, a valve closing mechanism, means for releasing the valve closing mechanism for movement toward closed position, said means being operable by the rotatable member at a second rotated position prior to said predetermined rotated position, a rotatable cam positioned in the path of closing movement of said valve closing mechanism having a first portion for retaining the mechanism in position at which the valve is partially open and a second portion for permitting further closing movement of the mechanism, and means operable by the driving means of the register for rotating the cam during a dispensing operation, said first portion of the cam being engageable by the valve closing mechanism when the presettable member is at said second rotated position and the second portion being engaged when the presettable member is at said predetermined initial rotated position.

3. A preselector mechanism for use with a liquid dispensing apparatus of the type having a shut-off valve and a register provided with resetting and driving means, said preselector mechanism comprising a movable member connectible to the valve for controlling same, means biasing said member in a valve closing direction, latching means including a trip lever for latching the movable member in valve open position, a settable member, means for returning the settable member to initial position operable by the driving means of the register, means on the settable member for tripping the trip lever at a predetermined position of the settable means, means for operating the resetting means of the register, and means actuated by the last named means for shifting the movable member to latching position and for setting the settable member away from initial position.

4. A preselector mechanism for use with a liquid dispensing apparatus of the type having a shut-off valve and a register provided with resetting and driving means, said preselector mechanism comprising a movable member connectible to the valve for controlling same, means biasing said member in a valve closing direction, latching means including a trip lever for latching the member in valve open position, a settable member, means for returning the settable member to initial position during a dispensing operation operable by the driving means of the register, means on the settable member for tripping the trip lever at a predetermined position of the settable means, a manually rotatable shaft connectible to the resetting means of the register, cam means on the shaft for moving the movable member to latching position during a resetting operation, and means connected to the shaft including a pick-up pawl for moving the settable member away from initial position during a resetting operation.

5. A preselector mechanism for use with a liquid dispensing apparatus of the type having a shut-off valve and a register provided with resetting and driving means, said preselector mechanism comprising a rotatable shaft connectible to the valve for controlling same, means urging the shaft in a valve closing direction, a control member fixed to the shaft and rotatable therewith, a trip lever biased into engagement with said member for latching the member in rotated position at which the valve is open, a settable member adjacent said latching lever, means for returning the settable member to initial position operable by the driving means of the register, means on the settable member for moving the trip lever to unlatching position at a predetermined position of the settable means, a manually rotatable shaft connectible to the resetting means of the register, a cam on the last named shaft for moving the control member to latching position during a resetting operation, means connecting the settable member and the shaft for rotating the settable member away from initial position during a resetting operation, and means for disconnecting the last-named means at the completion of a resetting operation.

6. A preselector mechanism for use with a liquid dispensing apparatus of the type having a shut-off valve and a register provided with resetting and driving means, said preselector mechanism comprising a rotatable shaft connectible to the valve for controlling same, a control member fixed to the shaft and rotatable therewith, a rotatable cam positioned for engagement by said control member when the control member is rotated in a valve closing direction having a portion for retaining the member in rotated position where the valve is partially open and a second portion for permitting the member to move to position for fully closing the valve, means operable by the driving means of the register for rotating the cam, a pivotally mounted trip lever having means at one end for retaining the shaft and control member in rotated position at which the valve is fully opened, a rotatable member having a dial provided with indicia for indicating the setting thereof, means for presetting the rotatable member and dial away from zero, subtracting means for returning the member to zero operable by the driving means of the register, means on the member for tripping the trip lever at a predetermined position of the member prior to zero position, manually operable means for actuating the resetting means of the register, and means actuated by the last named means for moving the control means to valve open position during a resetting operation.

7. In a preselector mechanism for use with a liquid dispensing apparatus of the type having a shut-off valve and a register provided with driving means, a rotatable member, a dial fixed to the member for rotation therewith provided with indicia for indicating the rotated position of the rotatable member, a ratchet wheel fixed to the rotatable member, driving means for the ratchet wheel including a reciprocable pawl operable by the driving means of the register, a second ratchet wheel having a lost motion connection to the first named ratchet wheel and having inclined teeth for camming the driving pawl out of engagement with the teeth of the first ratchet wheel when the second ratchet wheel is moved out of register with the first ratchet wheel, and means for setting the rotatable member comprising means for rotating the second ratchet wheel.

8. In a preselector mechanism for use with a liquid dispensing apparatus of the type having a shut-off valve and a register provided with driving means, a rotatable member for releasing a biased valve closing mechanism at a predetermined rotated position of the member, a dial fixed to the member for rotation therewith having indicia for indicating the rotated position of the rotatable member, a first ratchet wheel fixed to the rotatable member, driving means for the first ratchet wheel including a reciprocable pawl operable by the driving means of the register, a second ratchet wheel in side by side relationship with the first ratchet wheel, lost motion driving means interconnecting the ratchet wheels comprising a pin on one of the wheels extending through an elongated slot in the other wheel, said pin and slot being arranged to cause the second ratchet wheel to drive the first ratchet wheel in a subtracting direction in register therewith and in the opposite direction out of register therewith, said second ratchet wheel having inclined teeth for camming the pawl out of engagement with the teeth of the first ratchet wheel when the ratchet wheels are moved out of register, and manually operable means for turning the second ratchet wheel.

9. In a preselector mechanism for use with a liquid dispensing apparatus of the type having a shut-off valve and a register provided with resetting and driving means, a rotatable member for releasing a biased valve closing mechanism at a predetermined rotated position of the member, a dial fixed to the member for rotation therewith having indicia for indicating the rotated position of the rotatable member, a first ratchet wheel fixed to the rotatable member, driving means for driving said ratchet wheel in a subtracting direction including a reciprocable pawl operable by the driving means of the register, a second ratchet wheel rotatably mounted in side by side relationship with the first ratchet wheel, means forming a lost motion connection between the two ratchet wheels to permit the second ratchet wheel to move out of register with the first ratchet wheel when driven in an adding direction, said second ratchet wheel having inclined teeth for camming out the reciprocable pawl when the ratchet wheels are moved out of register, means for driving the second ratchet wheel in combination with the resetting means of the register, and manually operable means for driving the second ratchet wheel independently of the resetting means.

10. In a preselector mechanism for use with a liquid dispensing apparatus of the type having a shut-off valve and a register provided with resetting and driving means, a rotatable member for releasing a biased valve closing mechanism at a predetermined rotated position of the member, a dial fixed to the member for rotation therewith having indicia for indicating the rotated position of the rotatable member, a first ratchet wheel fixed to the rotatable member, driving means for driving said ratchet wheel in a subtracting direction including a reciprocable pawl operable by the driving means of the register, a second ratchet wheel rotatably mounted in side by side relationship with the first ratchet wheel, means forming a lost motion connection between the two ratchet wheels to permit the second ratchet wheel to move out of register with the first ratchet wheel when driven in an adding direction, said second ratchet wheel having inclined teeth for camming out the reciprocable pawl when the ratchet wheels are moved out of register, a member connected for rotation with the resetting means of the register, means forming a one-way drive connection between the last named member and the second ratchet wheel, means for disconnecting the one-way drive at the completion of a resetting operation, and manually operable means for driving the second ratchet wheel.

11. In a preselector mechanism for use with a liquid dispensing apparatus of the type having a shut-off valve and a register provided with resetting and driving means, a rotatable member for releasing a biased valve closing mechanism at a predetermined rotated position of the member, a dial fixed to the member for rotation therewith having indicia for indicating the rotated position of the rotatable member, a first ratchet wheel fixed to the rotatable member, driving means for driving said ratchet wheel in a subtracting direction including a reciprocable pawl operable by the driving means of the register, a second ratchet wheel rotatably mounted in side by side relationship with the first ratchet wheel, means forming a lost motion connection between the two ratchet wheels to permit the second ratchet wheel to move out of register with the first ratchet wheel when driven in an adding direction, said second ratchet wheel having inclined teeth for camming out the reciprocable pawl when the ratchet wheels are moved out of register, a gear connected for rotation with the resetting means of the register, a one-way drive between the gear and the second ratchet wheel including a pawl carried by the gear, means for latching the pawl out of engaging position when the gear is rotated reversely at the completion of a resetting operation, and manually operable means for driving the second ratchet wheel independently of movement of said gear.

12. In a preselector mechanism for use with a liquid dispensing apparatus of the type having a shut-off valve and a register provided with resetting and driving means, a biased valve closing mechanism, a rotatable member for releasing the valve closing mechanism at a predetermined rotated position of the member, a dial mounted for rotation with the member provided with indicia for indicating the rotated position of the rotatable member, a ratchet wheel fixed to the rotatable member, driving means for rotating said ratchet wheel including a reciprocable pawl operable by the driving means of the register, a second rotatable member having means operable when the member is rotated for camming the pawl out of engagement with the ratchet wheel, and means for simultaneously rotating the said second rotatable member and operating the resetting means of the register.

13. A preselector mechanism for use with a liquid dispensing apparatus of the type having a shut-off valve and a register provided with resetting and driving means, said preselector mechanism comprising a rotatable member, a dial fixed to the member for rotation therewith having indicia for indicating the rotated position of the rotatable member, a first ratchet wheel fixed to the rotatable member, driving means for rotating said ratchet wheel in a subtracting direction including a reciprocable pawl operable by the driving means of the register, a second ratchet wheel rotatably mounted in side by side relationship with the first ratchet wheel, means forming a lost motion driving connection between the two ratchet wheels to permit the second ratchet wheel to advance relative to the second wheel when turned in an additive direction, said second ratchet wheel having teeth formed to cam the pawl out of engagement with the teeth of the first ratchet wheel when so advanced, manual means for turning the second ratchet wheel in either direction, a spring loaded valve closing mechanism connectible to said valve, means for moving the last named mechanism to valve open position and simultaneously operating the resetting means of the register, latching means for latching the valve closing mechanism in open position including a trip lever arm engageable with said rotatable member, said rotatable member having means for tripping the lever arm to unlatching position when the rotatable member is in a predetermined rotated position, and cam means operable by the driving means of the register for preventing full closing movement of the valve closing mechanism during a predetermined further operation of said driving means.

14. A preselector mechanism for use with a liquid dispensing apparatus of the type having a shut-off valve and a register provided with resetting and driving means, said mechanism comprising a valve operating member biased in a valve closing direction, a cam operable by the driving means of the register for holding the member in partially open position during a predetermined movement of said driving means and for thereafter fully releasing the member, and means for releasing the valve operating member for cooperation with the cam comprising a latch for holding the valve operating member in valve open position, a trip lever for releasing the latch, a presettable rotatable member having means for actuating the trip lever at a predetermined rotated position thereof, means operable by the driving means of the register for rotating the rotatable member during a dispensing operation, and means for simultaneously presetting the rotatable member and moving the valve operating member to valve opening position upon operation of the resetting means of the register.

HAROLD B. VROOM.

References Cited in the file of this patent

UNITED STATES PATENTS

| Number | Name | Date |
|---|---|---|
| 2,139,216 | Wydler | Dec. 6, 1938 |
| 2,358,712 | Hines | Sept. 19, 1944 |